(12) United States Patent
Ichimura et al.

(10) Patent No.: US 6,400,294 B1
(45) Date of Patent: *Jun. 4, 2002

(54) METHOD OF MUTING A DIGITAL SIGNAL AND A DIGITAL SIGNAL RECORDING APPARATUS AND A DIGITAL SIGNAL PROCESSING APPARATUS EMPLOYING THE DIGITAL SIGNAL MUTING METHOD

(75) Inventors: Gen Ichimura, Tokyo; Masayoshi Noguchi, Chiba, both of (JP)

(73) Assignee: SOny Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 535 days.

(21) Appl. No.: 08/754,270

(22) Filed: Nov. 20, 1996

(30) Foreign Application Priority Data

Nov. 30, 1995 (JP) .............................................. 7-313353

(51) Int. Cl.[7] .............................................. H03M 3/00

(52) U.S. Cl. ....................................................... 341/143
(58) Field of Search .................................. 341/143, 144

(56) References Cited

U.S. PATENT DOCUMENTS

| 4,142,066 A | * | 2/1979 | Ahamed ...................... 341/143 |
| 4,812,815 A | * | 3/1989 | Miyakoshi et al. ......... 341/144 |
| 4,857,928 A | * | 8/1989 | Gailus et al. ................ 341/143 |
| 5,574,453 A | * | 11/1996 | Nishio et al. ................ 341/143 |

FOREIGN PATENT DOCUMENTS

JP          5-145423         *   6/1993

* cited by examiner

Primary Examiner—Howard L. Williams
(74) Attorney, Agent, or Firm—Jay H. Maioli

(57) ABSTRACT

A muting circuit for muting a 1-bit digital signal which is not in need of a special circuit configuration, which a muting signal for muting the 1-bit digital signal is selected such that the inhibiting frequencies of an infinite response filter used for converting the 1-bit digital signal will be coincident with the spectrum distribution of the muting signal generated responsive to a muting command.

10 Claims, 7 Drawing Sheets

METHOD OF MUTING A DIGITAL SIGNAL AND A DIGITAL SIGNAL RECORDING APPARATUS AND A DIGITAL SIGNAL PROCESSING APPARATUS EMPLOYING THE DIGITAL SIGNAL MUTING METHOD

BACKGROUND OF THE INVENTION

1. Field of the Invention

This invention relates to a digital signal processing apparatus for muting a digital signal digitized with at least one bit, and a digital signal recording apparatus for recording the digital signal or the muted signal on a recording medium.

2. Description of the Related Art

As a method for digitizing audio signals, a method known as a sigma-delta ($\Sigma\Delta$) method has become known (see for example Y. Yamazaki, "AD/DA Converter and Digital Filter", Journal of Japan Society of Acoustics, Vol.46, No.3 (1990), pp. 251–257).

The 1-bit digital data, obtained by this $\Sigma\Delta$ modulation, is represented by a sampling frequency significantly higher (such as 44.1 kHz times 64) and a data word length significantly shorter (such as 1 bit) than those of the data format hitherto used for conventional digital audio (such as the sampling frequency of 64 kHz and the data word length of 16 bits) and is characterized by a broad transmission frequency range. By this $\Sigma\Delta$ modulation, a high dynamic range can be secured in an audio range which is an extremely low frequency range as compared to the 64-tuple oversampling frequency. This feature can be exploited for recording or data transmission with high sound quality.

The $\Sigma\Delta$ modulation circuit itself is not a new technique and is frequently used in an A/D converter since the circuit structure can be easily designed as an IC and lends itself easily to high-precision A/D conversion.

In case of 1-bit $\Sigma\Delta$ modulation, an audio signal is represented by a bi-level pulse density modulation of "+1" and "−1". At this time, a $\Sigma\Delta$ signal Xn at a point equivalent to a neutral point voltage (that is, 0 V) as a reference for an audio signal is represented by the equation (1):

$$\sum_{n=0}^{m} Xn = \sum_{n=0}^{m=a+b} (+1) \times a + (-1) \times b = 0 \to a = b \quad (1)$$

As will be clear from the equation (1), a and b are selected so that, if the neutral point potential is to be represented, the pulse density for "+1" and that for "−1" will be equal to each other.

If the 1-bit $\Sigma\Delta$ modulated signal is actually recorded/reproduced or transmitted as a digital signal, "+1" is converted into "1", while "−1" is converted into "0". If an unusual event occurs in the course of recording and reproduction or if the transmission path is ruptured such that the signal is lost, the signal is fixed at "1" or "0". Since a series of contiguous "1" s or "0"s in $\Sigma\Delta$ modulation is equivalent to a positive maximum value or to a negative maximum value, respectively, there is a risk that, at a time moment of occurrence of an unusual event in the course of recording/reproduction or rupture of the transmission path, the noise of the maximum output is generated to destruct an amplifier for monitoring or a speaker.

The digital audio recorder for recording the $\Sigma\Delta$ modulated digital audio signal and the peripheral equipment are of a higher dynamic range and of a broader transmission frequency range than before in order to realize high flexibility for coping with a variety of digital audio media which will be developed in the future.

Meanwhile, for realization of a digital audio recorder for recording $\Sigma\Delta$ modulated digital audio signals and the peripheral equipment, the function of noise prevention and the muting function for protecting downstream side equipment in case of an occurrence of signal interruption as a result of a malfunction of the equipment, damage to the recording media or rupture of the transmission path, are indispensable. However, there has hitherto lacked a method for muting in the digital signal processing system handling $\Sigma\Delta$ modulation.

SUMMARY OF THE INVENTION

It is therefore an object of the present invention to provide a digital signal processing apparatus capable of muting at least a one-bit digital signal and a digital signal recording apparatus capable of recording at least the one-bit digital signal or muted signal.

In one aspect, the present invention provides a digital signal processing apparatus for muting a digital signal obtained on digitizing in at least one bit. The apparatus includes muting pattern signal generating means for generating a pre-set muting pattern, switching means for selectively switching between the digital signal digitized with at least one bit and the muting pattern signal generated by the muting pattern signal generating means, and an finite response filter means for converting an output of the switching means into an analog signal. The spectrum characteristics of the pre-set muting pattern signal are selected to coincide with the inhibiting frequencies of the finite response filter means.

In another aspect, the present invention provides a digital signal recording apparatus for muting a digital signal obtained on digitizing in at least one bit in a recording medium. The apparatus includes muting pattern signal generating means for generating a pre-set muting pattern, switching means for selectively switching between the digital signal digitized with at least one bit and the muting pattern signal generated by the muting pattern signal generating means, finite response filter means for converting an output of the switching means into an analog signal, and recording means for recording an output signal of the switching means on a recording medium. The spectrum characteristics of the pre-set muting pattern signal are selected to coincide with the inhibiting frequencies of the finite response filter means.

In yet another aspect, the present invention provides a digital signal muting method for muting a digital signal digitized with at least one bit, based on a muting command, at the time of transmission of said digital signal. The method includes the steps of selecting a muting signal generated by the muting command so that the spectrum distribution of the muting signal will coincide with the inhibiting frequencies of an finite response filter configured for converting the digital signal into an analog signal.

With the digital signal processing apparatus according to the present invention, the switcher switches between the muting pattern signal generated by the muting pattern generating means and at least one-bit digital signal, and the output selected by this switching is converted by an FIR filter into an analog signal. Since the muting pattern signal has plural inhibiting frequencies corresponding to the inhibiting frequencies of the FIR filter so that the analog signal will be at a neutral point potential after analog modulation, the 1-bit digital signal can be muted when the muting pattern signal is selected by the switcher.

With the digital signal recording apparatus according to the present invention, the switcher switches between the muting pattern signal generated by the muting pattern generating means and at least one-bit digital signal, and the output selected by this switching is recorded on the recording means, at the same time as it is converted by an FIR filter into an analog signal. Since the muting pattern signal has plural inhibiting frequencies corresponding to the inhibiting frequencies of the FIR filter so that the analog signal will be at a neutral point potential after analog modulation, the muted 1-bit digital signal can be recorded when the muting pattern signal is selected by the switcher.

DESCRIPTION OF THE PREFERRED EMBODIMENTS

Figure 1:
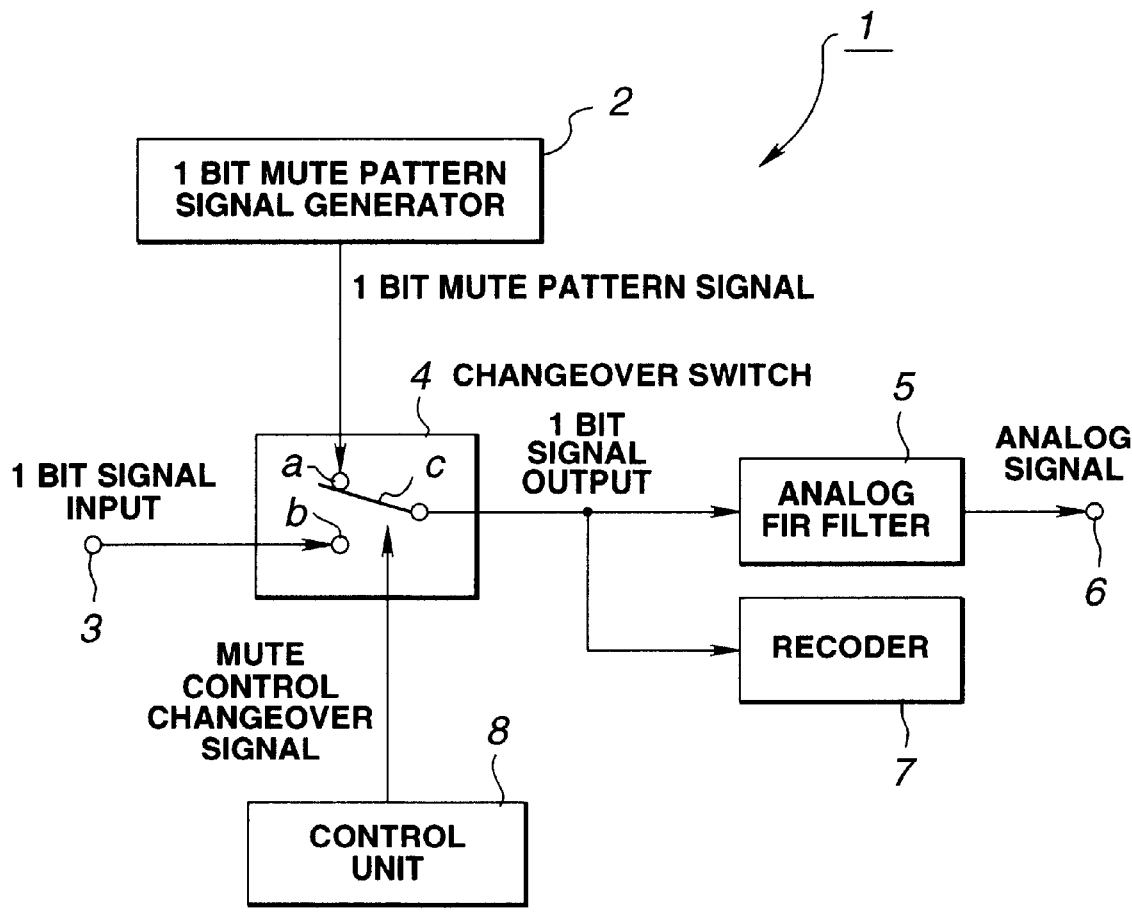
FIG. 1 is block view of a digital signal recording device according to the present invention.

Referring to the drawings, preferred embodiments of the digital signal processing device and the recording device will be explained in detail.

FIG. 1 shows an arrangement comprised of a digital signal processing device 1 for muting a digital signal digitized with one bit by $\Sigma\Delta$ modulation, a muting pattern signal generator 2 for generating a muting pattern signal for the 1-bit digital signal, a changeover switch 4 for selection between the 1-bit digital signal and the muting pattern signal and for outputting the selected signal, and an analog FIR filter 5 for converting the selected output from the changeover switch 4 into an analog signal. The selected output of the changeover switch 4 is recorded in a recording unit 7.

The changeover switch 4 has its switching operation controlled by a muting control changeover signal from a control unit 8. The control unit 8 generates the muting control switching signal for digitally muting the 1-bit digital signal from the input terminal 3 for a pre-set time period. The changeover switch 4 is responsive to this signal to switch between a fixed terminal b, fed with the 1-bit digital signal, and a fixed terminal a, fed with the 1-bit muting signal from the muting pattern signal from the muting pattern signal generator 2.

The muting pattern signal generated by the muting pattern signal generator 2 has plural components associated with the inhibition frequencies of the analog FIR filter 5 so that the analog signal following analog demodulation will be at a neutral point potential.

The selection output of the changeover switch 4, controlled by the control unit 8, is fed to the analog FIR filter 5 for analog demodulation for digital-to-analog conversion.

The resulting analog signal is outputted at an output terminal 6. The selection output, selected by the changeover switch 4, may be recorded in the recording unit 7.

Figure 2:
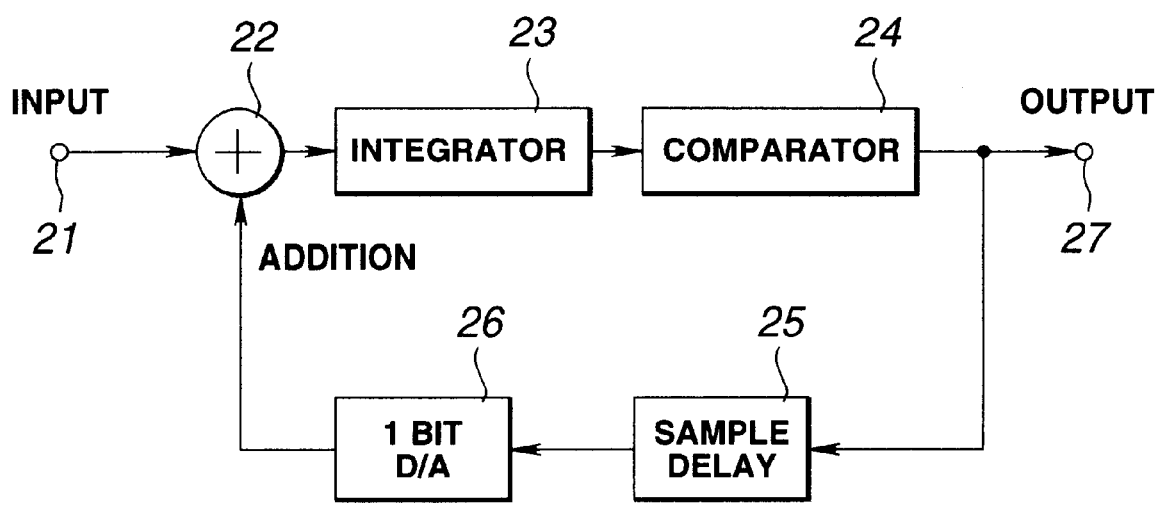
FIG. 2 is a block diagram showing a $\Sigma\Delta$ modulator according to the present invention.

A 1-bit digital signal, entering the input terminal 3, is outputted at a $\Sigma\Delta$ modulation circuit shown in FIG. 2. This $\Sigma\Delta$ modulation circuit is now explained.

An input signal entering an input terminal 21 is supplied via an adder 22 to an integrator 23, an output of which is sent to a comparator 25 for comparison of a neutral point potential of the input signal with the output signal of the integrator 23. The comparator 23 thus performs one-bit quantization every sampling period to output 1-bit digital data.

This 1-bit digital data, which is the quantized data, is sent to a 1-sample delay unit 25 so as to be delayed one sampling period. This delay data is converted by a 1-bit digital-to-analog converter 26 into an analog signal which is supplied to the adder 22 so as to be summed to the input signal from the input terminal 21. A 1-bit output digital signal from the comparator 24 is sent via an output terminal 27 to the input terminal 3.

Figure 3:
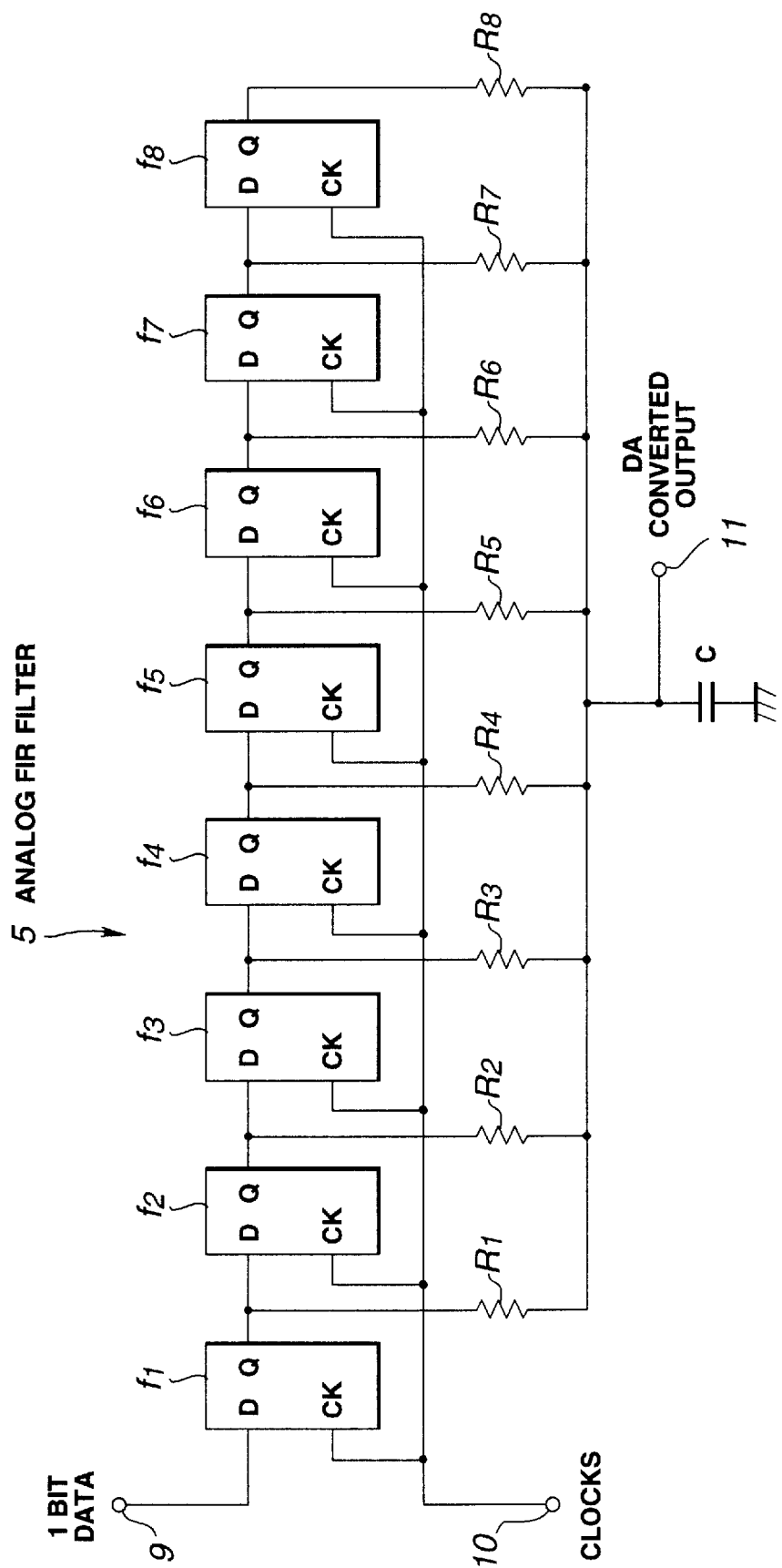
FIG. 3 is a detailed block diagram of an FIR filter according to the present invention.

Referring to FIG. 3, the analog FIR filter 5 is explained. This analog FIR filter 5 can be fabricated in accordance with a digital-to-analog conversion system disclosed by the present Assignee in our Japanese Patent Laid-Open No.HEI-5-145423.

The analog FIR filter 5, shown in FIG. 3, is made up of eight cascade-connected D-flip-flops $f_1$, $f_2$, $f_3$, . . . $f_8$ and eight resistors $R_1$, $R_2$, $R_3$, . . . $R_8$, connected to these flip-flops $f_1$, $f_2$, $f_3$, . . . $f_8$, respectively. The currents from these eight resistors $R_1$, $R_2$, $R_3$, . . . $R_8$ are summed together to form an analog FIR filter, an output of which is smoothed by a capacitor C and outputted at an output terminal 11.

An input terminal 9, fed with the 1-bit digital signal, is connected to a data input terminal D of the D-flip-flop $f_1$, an output terminal Q of which is connected to a data input terminal D of the D-flip-flop $f_2$. An output terminal Q of the D-flip-flop $f_2$ is connected to a data input terminal D of the D-flip-flop $f_3$, an output terminal Q of which is connected to a data input terminal D of the D-flip-flop $f_4$. An output terminal Q of the D-flip-flop $f_4$ is connected to a data input terminal D of the D-flipflop $f_5$, an output terminal Q of which is connected to a data input terminal D of the D-flip-flop $f_6$. An output terminal Q of the D-flipflop $f_6$ is connected to a data input terminal D of the D-flipflop $f_7$, an output terminal Q of which is connected to a data input terminal D of the D-flip-flop $f_8$.

An input terminal 10, fed with clock signals, is connected to a clock input terminal CK of each of the D-flip-flops $f_1$, $f_2$, $f_3$, . . . $f_8$.

The resistor $R_1$ has its one end connected to the output terminal Q of the D-flipflop $f_1$, while the resistor $R_2$ has its one end connected to the output terminal Q of the D-flipflop $f_2$. The resistor $R_3$ has its one end connected to the output terminal Q of the D-flipflop $f_3$, while the resistor $R_4$ has its one end connected to the output terminal Q of the D-flipflop $f_4$. The resistor $R_5$ has its one end connected to the output terminal Q of the D-flipflop $f_5$, while the resistor $R_6$ has its one end connected to the output terminal Q of the D-flipflop $f_8$. Similarly, the resistor $R_7$ has its one end connected to the output terminal Q of the D-flipflop $f_7$, while the resistor $R_8$ has its one end connected to the output terminal Q of the D-flipflop $f_8$.

The opposite ends of the resistors $R_1$, $R_2$, $R_3$, . . . $R_8$ are connected together and the output terminal 11 is derived from the junction point, while the analog output is smoothed by the capacitor C connected between the junction point and the ground.

Since the analog FIR filter 5 is configured for smoothing an output for producing an analog signal, digital-to-analog conversion can be realized with a high precision and a high S/N ratio by removing the noise outside the passband produced by noise shaping in the course of the digital-to-analog conversion. In addition, since it suffices to secure relative precision of resistance weighting corresponding to the coefficients, the filter circuit can be easily designed as an IC circuit.

Figure 4:
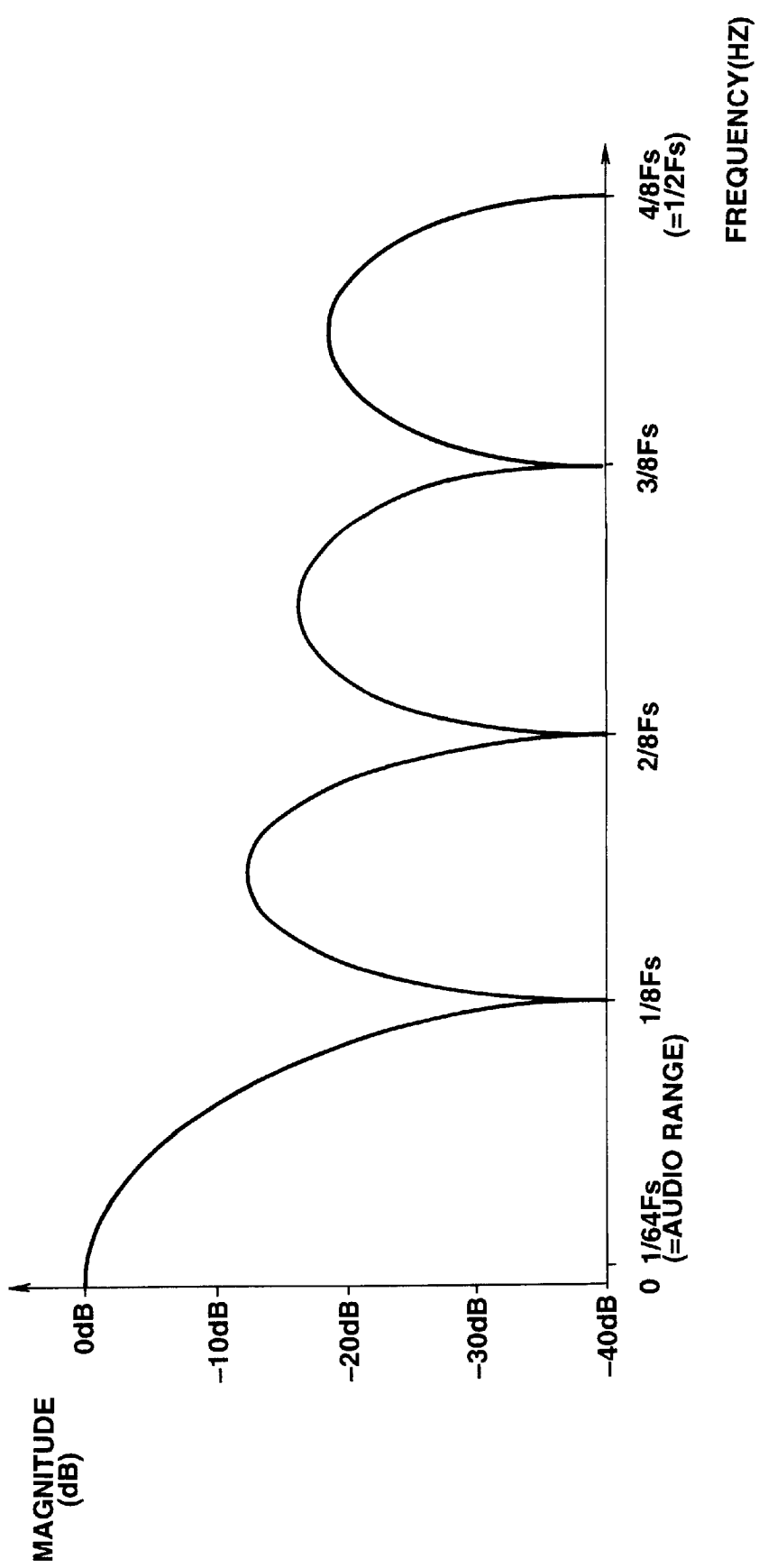
FIG. 4 is a graph showing the frequency response of muted signals in a first embodiment.

The number of taps N of the analog FIR filter 5 is 8, with the output resistance values of the D-flipflops $f_1, f_2, f_3, \ldots f_8$ being all equal. This analog FIR filter 5 has frequency versus amplitude characteristics as shown in FIG. 4. As will be seen from FIG. 4, the gain of the analog FIR filter 5 is lowered in the high frequency range. Moreover, there are plural inhibiting frequencies corresponding to the so-called dip of the amplitude characteristics. The numbers and the magnitudes of these inhibiting frequencies depend on the number of taps N of the analog FIR filter 5. Since N=8, the inhibition frequencies are represented by FS n/8, where FS is the sampling frequency and n=1 to 8.

Since there are plural inhibiting frequencies corresponding to the so-called dip of the amplitude characteristics in the analog FIR filter 5, as stated above, if 1-bit pattern signals each having a component only in each of these frequencies are generated by the muting pattern signal generator 2, these 1-bit pattern signals represent 1-bit muting pattern signals.

By way of examples, a 1-bit pattern signal which is "10010110" in binary notation and "$96" in hexadecimal notation is considered. The 1-bit muting pattern signal is generated by repeating this "$96" pattern by the muting pattern signal generator 2.

Figure 5:
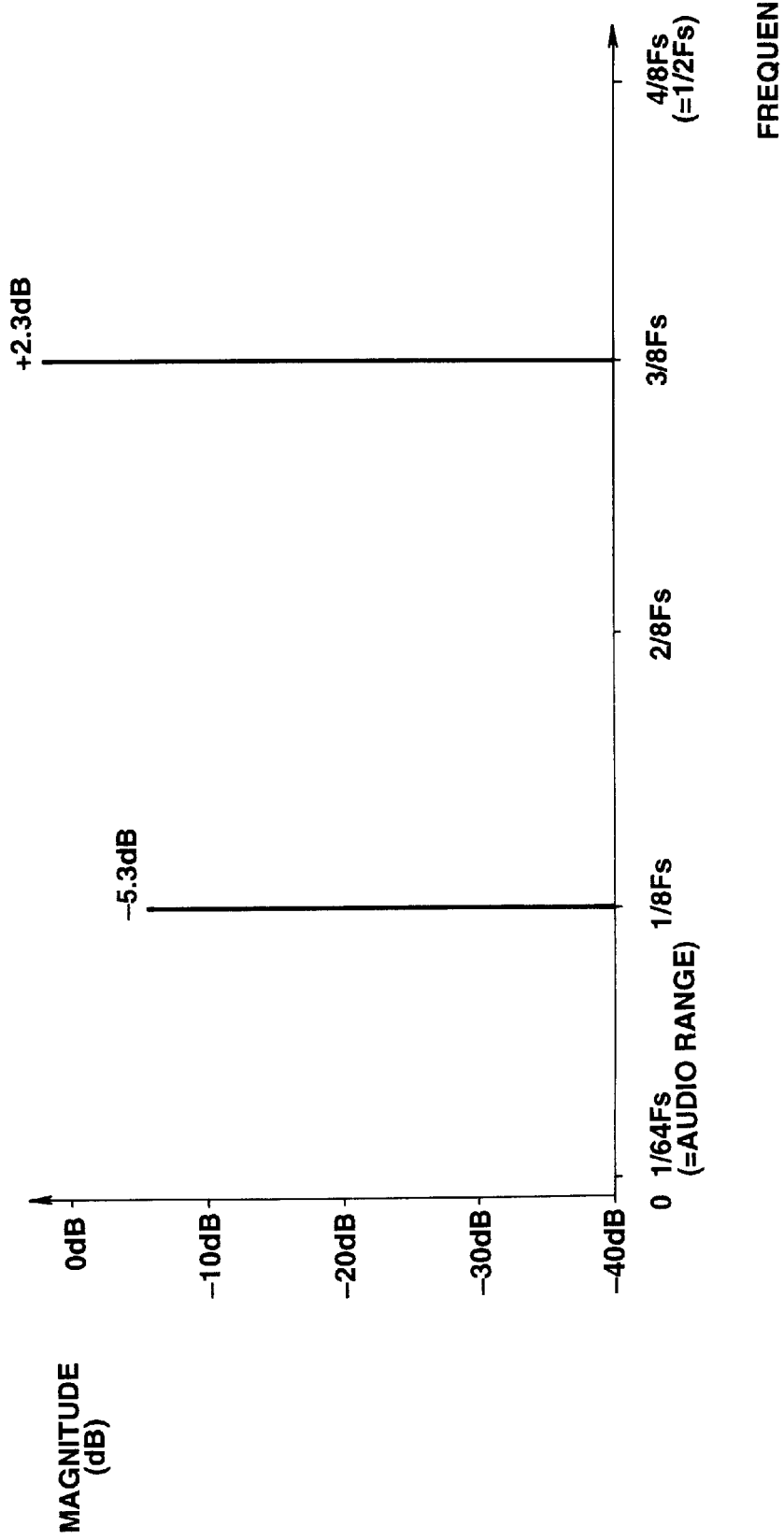
FIG. 5 shows the frequency response of the muted signal in the first embodiment.

FIG. 5 shows the distribution of frequency components of the pattern "$96". The pattern frequency components are FS 1/8 and FS 3/8 thus coinciding with the inhibiting frequencies shown in FIG. 5. Consequently, this pattern "$96" may be fed to the analog FIR filter 5 and eliminated, as a result of which an analog signal which is a neutral point voltage (usually 0 V) equivalent to the absence of a signal may be reproduced.

Figure 6:
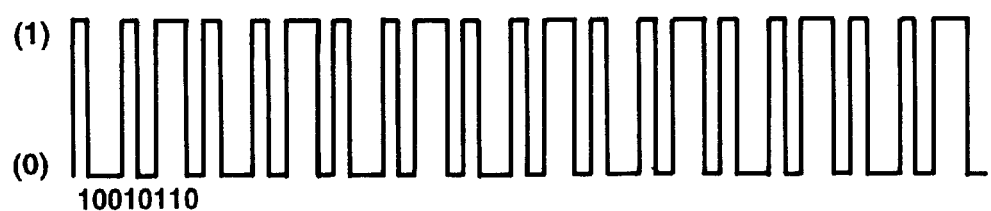
FIG. 6 is a waveform diagram showing the muted signal output.
Figure 7:
FIG. 7 shows the muting signal after passage through the FIR filter.

FIGS. 6 and 7 show a time waveform of the pattern "$96" and a time waveform after entrance of the pattern "$96" to the analog FIR filter 5, respectively. Thus, an effect may be achieved which is equivalent to digitally muting audio data.

Figure 8:
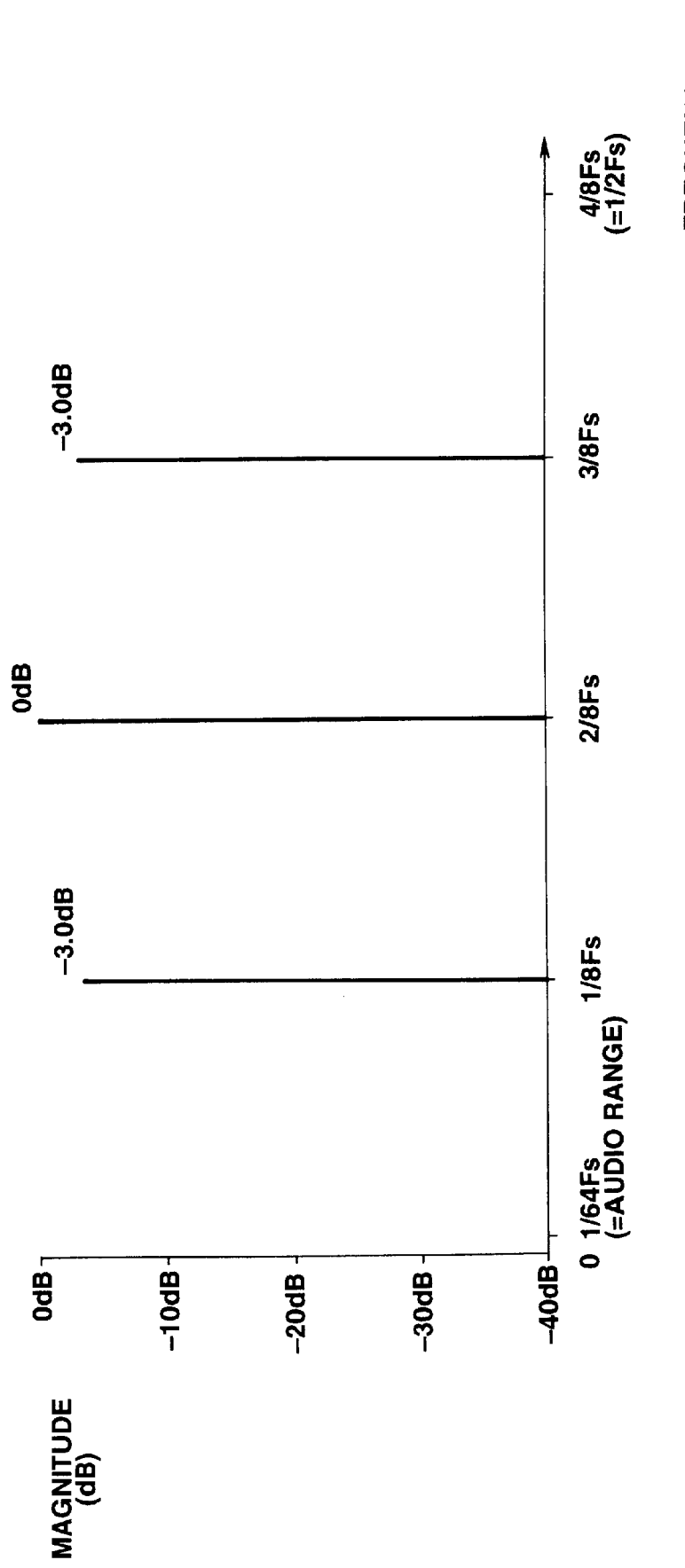
FIG. 8 is a graph showing the frequency response of the muted signal in a second embodiment.

It is also possible for the muting pattern signal generator 2 to repeat the pattern of "$93" in hexadecimal notation, having the state of frequency distribution shown in FIG. 8, for generating the 1-bit muting pattern. These pattern frequency components are FS 1/8, FS 2/8 and FS 3/8, coincident with the inhibiting frequencies shown in FIG. 4. Consequently, this pattern "$93" may be fed to the analog FIR filter 5 and eliminated, as a result of which an analog signal which is a neutral point voltage (usually 0 V) equivalent to the absence of a signal may be reproduced.

The processing for analog demodulation mainly has been explained above, however, if the number of taps of the analog FIR filter used at the time of analog demodulation is known, processing may be done in a similar manner during recording for recording a digitally muted signal.

If the analog FIR filter is not used at the time of analog demodulation, a high-precision analog filter may be used for eliminating the frequency components which are in a high frequency range for reducing the effect on the audible range.

Although the 1-bit digital signal obtained on $\Sigma\Delta$ modulation has been discussed above, multi-bit $\Sigma\Delta$ modulation may be dealt with by a similar constitution for implementing the muting function.

What is claimed is:

1. A digital signal processing apparatus for muting a digital signal digitized with at least one bit, comprising:

muting pattern signal generating means for generating a pre-set muting pattern signal;

switching means for selectively switching between said digital signal digitized with at least one bit and said pre-set muting pattern signal generated by said muting pattern signal generating means; and finite impulse response filter means for converting an output of said switching means into an analog signal, wherein spectrum characteristics of said pre-set muting pattern signal are selected to coincide with a plurality of stop-band frequencies of said finite impulse response filter means and to include stop-band frequencies below a cut-off frequency of 1/2 Fs of said finite impulse response filter means.

2. The digital signal processing apparatus as claimed in claim 1, wherein said digital signal is a 1-bit digital signal obtained by a $\Sigma\Delta$ modulator.

3. The digital signal processing apparatus as claimed in claim 1, wherein said pre-set muting pattern signal is 96 HEX.

4. The digital signal processing apparatus as claimed in claim 1, wherein said pre-set muting pattern signal is 93 HEX.

5. A digital signal recording apparatus for muting a digital signal digitized with at least one bit upon recording in a recording medium, comprising:

muting pattern signal generating means for generating a pre-set muting pattern signal;

switching means for selectively switching between said digital signal digitized with at least one bit and said pre-set muting pattern signal generated by said muting pattern signal generating means;

finite impulse response filter means for converting an output of said switching means into an analog signal; and recording means for recording said output signal of said switching means on the recording medium, wherein spectrum characteristics of said pre-set muting pattern signal are selected to coincide with a plurality of stop-band frequencies of said finite impulse response filter means and to include stop-band frequencies below a cut-off frequency of 1/2 Fs of said finite impulse response filter means.

6. The digital signal recording apparatus as claimed in claim 5, wherein said digital signal is a 1-bit digital signal obtained by a $\Sigma\Delta$ modulator.

7. The digital signal recording apparatus as claimed in claim 5, wherein said pre-set muting pattern signal is 96 HEX.

8. The digital signal recording apparatus as claimed in claim 5, wherein said pre-set muting pattern signal is 93 HEX.

9. A digital signal muting method for muting a digital signal digitized with at least one bit using a muting command at a time of transmission of said digital signal, comprising:

selecting a pre-set muting signal generated in response to said muting command so that a spectrum distribution of said pre-set muting signal coincides with a plurality of stop-band frequencies of a finite impulse response filter configured for converting said digital signal into an analog signal and to include stop-band frequencies below a cut-off frequency of 1/2 Fs of said finite impulse response filter, and wherein said pre-set muting pattern signal 96 HEX.

10. The digital signal muting method as claimed in claim 9, wherein said pre-set muting pattern signal is 96 HEX.

* * * * *